(12) United States Patent
Crowell et al.

(10) Patent No.: US 11,850,719 B2
(45) Date of Patent: Dec. 26, 2023

(54) GUARD AND ADAPTOR FOR POWER TOOLS

(71) Applicant: Robert Bosch GmbH, Stuttgart (DE)

(72) Inventors: Christopher R. Crowell, Des Plaines, IL (US); Eric J. Acevedo, Chicago, IL (US); Jeremy D. Rubens, Palantine, IL (US); Alan B. Lebowitz, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 1196 days.

(21) Appl. No.: 16/447,202

(22) Filed: Jun. 20, 2019

(65) Prior Publication Data

US 2019/0389046 A1 Dec. 26, 2019

Related U.S. Application Data

(60) Provisional application No. 62/687,596, filed on Jun. 20, 2018.

(51) Int. Cl.
*B25F 3/00* (2006.01)
*B25F 5/02* (2006.01)
*B24B 23/02* (2006.01)
*B23Q 11/00* (2006.01)

(52) U.S. Cl.
CPC ............ *B25F 3/00* (2013.01); *B24B 23/028* (2013.01); *B25F 5/02* (2013.01); *B23Q 11/0046* (2013.01); *B23Q 11/0071* (2013.01)

(58) Field of Classification Search
CPC .......... B24B 23/028; B25F 5/023; B25F 3/00; B23Q 11/0046; B23Q 11/005; B23Q 11/0078; B23Q 11/08; B23Q 11/0891
See application file for complete search history.

(56) References Cited

U.S. PATENT DOCUMENTS

| 4,986,371 | A * | 1/1991 | Lowe | B23Q 11/08 173/171 |
|---|---|---|---|---|
| 7,316,528 | B2 * | 1/2008 | Cooper | B27C 5/10 144/136.95 |
| 2005/0200087 | A1 * | 9/2005 | Vasudeva | B25F 3/00 279/143 |
| 2014/0020919 | A1 * | 1/2014 | Dvorak | B23Q 11/0046 279/157 |

* cited by examiner

*Primary Examiner* — Daniel Jeremy Leeds
(74) *Attorney, Agent, or Firm* — Maginot, Moore & Beck LLP

(57) ABSTRACT

A portable power tool includes a housing, a motor enclosed within the housing, an accessory tool holder secured to the output shaft of the motor, and an attachment interface on a nose portion near the accessory tool holder. An attachment is configured to attached and removed from the nose portion of the housing. The attachment includes a housing interface that is configured to interact with the attachment interface to position the attachment at a predetermined position on the nose portion of the housing. The attachment interface and the housing interface are configured to be magnetically attracted to each other with sufficient force to retain the attachment on the nose portion of the housing during normal operating conditions while allowing the attachment to be removed from the nose portion of the housing by hand by the operator.

17 Claims, 9 Drawing Sheets

GUARD AND ADAPTOR FOR POWER TOOLS

CROSS-REFERENCE TO RELATED APPLICATIONS

This application claims priority to U.S. Provisional Application Ser. No. 62/687,596 entitled "GUARD AND ADAPTOR FOR POWER TOOLS" by Crowell et al., filed Jun. 20, 2018, the disclosure of which is hereby incorporated herein by reference in its entirety.

TECHNICAL FIELD

The disclosure is directed to power tools, and, in particular, directed to accessories for use with power tools.

BACKGROUND

In general, rotary power tools and oscillating power tools are light-weight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is configured to rotate and/or oscillate an output shaft at relatively high frequencies. A tool holder is provided on an end of the output shaft. The tool holder that is configured to releasably retain accessory tools so that the accessory tools can be driven to perform work by the output shaft.

Rotary power tools and oscillating power tools, e.g., angle grinders, sanders, rotary tools, oscillating tools, are typically provided with a configuration that facilitates the performance of certain types of jobs. The different types of power tools are typically provided with different types of guards and/or guides which facilitate the function which they are designed to perform. In addition, the tool holders of power tools that perform one type of job, e.g., angle grinders, are typically only capable of retaining accessory tools which are capable of performing that type of job, e.g., grinding discs. Accessory tools for other types of tools, such as rotary tools, are typically not capable of being retained by the tool holders of other types of tools, such as angle grinders.

What is needed are accessory attachment systems and guard/guide attachment systems that can enhance and broaden the capabilities of power tools.

SUMMARY OF THE CLAIMS

According to one embodiment, a portable power tool includes a housing, a motor enclosed within the housing, an accessory tool holder secured to the output shaft of the motor, and a nose portion with an attachment interface near the accessory tool holder. An attachment is configured to be attached and removed from the nose portion of the housing. The attachment includes a housing interface that is configured to interact with the attachment interface to position the attachment at a predetermined position on the nose portion of the housing. The attachment interface and the housing interface are configured to be magnetically attracted to each other with sufficient force to retain the attachment on the nose portion of the housing during normal operating conditions while allowing the attachment to be removed from the nose portion of the housing by hand by the operator.

According to another embodiment, a portable power tool includes a housing having a nose portion and a gripping portion. The nose portion defines an opening. A motor is enclosed within the housing, and an output shaft extends through the opening in the nose portion of the housing. An accessory tool holder is secured to an end portion of the output shaft exterior to the nose portion of the housing. The accessory tool holder is configured to retain accessory tools with a first type of shank. A tool holder adaptor is configured to be retained by the accessory tool holder in a same manner as the accessory tools with the first type of shank. The tool holder adaptor being configured to retain accessory tools with a second type of shank different from the first type of shank when the tool holder adaptor is retained by the accessory tool holder.

In yet another embodiment, a portable power tool includes a housing having a nose portion and a gripping portion. The nose portion defining an opening. A motor is enclosed within the housing. An output shaft of the motor extends through the opening in the nose portion of the housing. An accessory tool holder is secured to an end portion of the output shaft exterior to the nose portion of the housing. The accessory tool holder is configured to retain accessory tools with a first type of shank. A tool holder adaptor is configured to be retained by the accessory tool holder in a same manner as the accessory tools with the first type of shank. The tool holder adaptor is configured to retain accessory tools with a second type of shank different from the first type of shank when the tool holder adaptor is retained by the accessory tool holder. The nose portion includes an attachment interface located around the opening. The power tool includes an attachment configured to be attached and removed from the nose portion of the housing as desired by an operator of the power tool. The attachment includes a housing interface that is configured to interact with the attachment interface to position the attachment at a predetermined position on the nose portion of the housing. The attachment interface and the housing interface are configured to be magnetically attracted to each other with sufficient force to retain the attachment on the nose portion of the housing during normal operating conditions while allowing the attachment to be removed from the nose portion of the housing by hand by the operator.

BRIEF DESCRIPTION OF THE DRAWINGS

FIG. 10 depicts a guard/guide attachment in the form of a saw blade guard for use with the power tool of.
FIG. 1.

DETAILED DESCRIPTION

Figure 1:
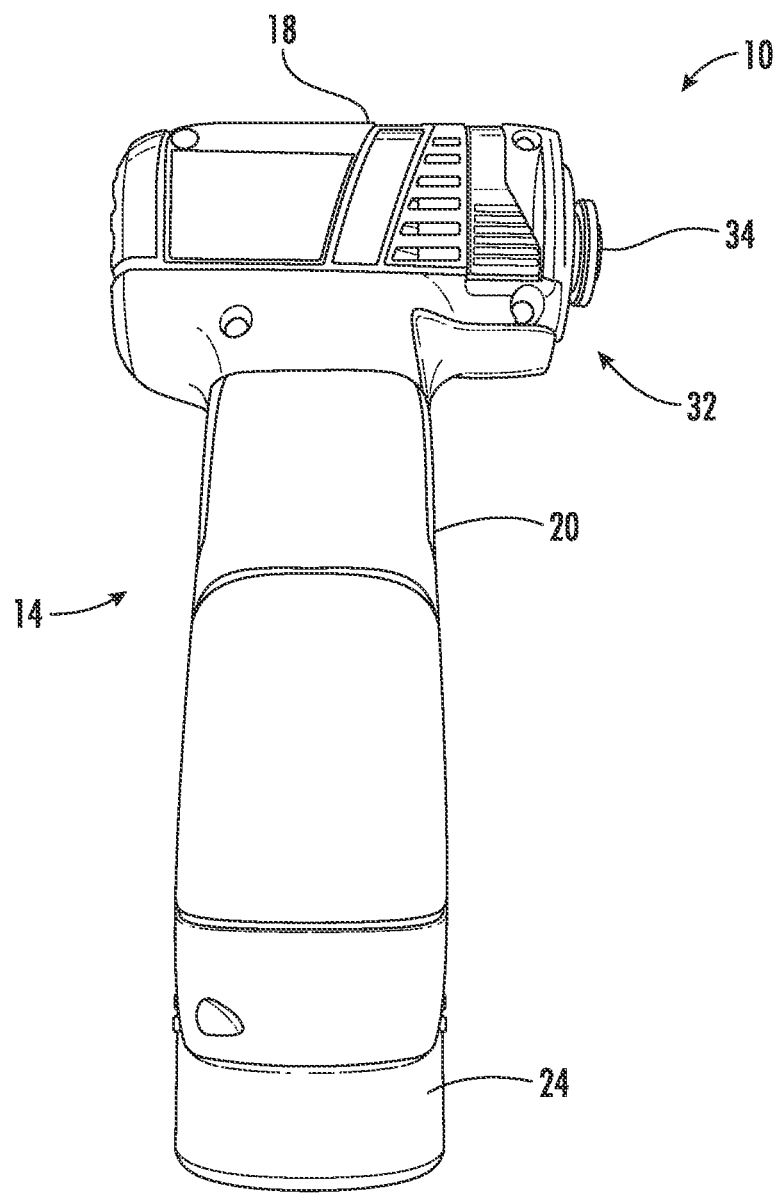
FIG. 1 is a side view of an embodiment of a power tool.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

According to one embodiment of the present disclosure, a portable power tool includes a housing, a motor enclosed within the housing, an accessory tool holder secured to the output shaft of the motor, and a nose portion with an attachment interface near the accessory tool holder. An attachment is configured to be attached and removed from the nose portion of the housing. The attachment includes a housing interface that is configured to interact with the attachment interface to position the attachment at a predetermined position on the nose portion of the housing. The attachment interface and the housing interface are configured to be magnetically attracted to each other with sufficient force to retain the attachment on the nose portion of the housing during normal operating conditions while allowing the attachment to be removed from the nose portion of the housing by hand by the operator.

In embodiments, at least one of the attachment interface and the housing interface includes at least one permanent magnet while the other of the attachment interface and the housing interface includes at least one ferromagnetic structure configured to be magnetically attracted to the at least one permanent magnet.

In embodiments, the attachment interface includes a cylindrical wall that protrudes along the output shaft. In such embodiments, the housing interface includes a collar portion that is configured to fit snugly around the cylindrical wall. The collar portion may include at least one permanent magnet while the cylindrical wall includes a ferromagnetic material configured to be attracted to the at least one permanent magnet.

The accessory tool holder is preferably configured to retain different types of accessory tools. The attachment for the power tool may be one of a plurality of attachments. Each of the attachments in the plurality of attachments respectively include the housing interface and a different type of guard/guide portion. The type of guard/guide portion of each of the attachments is associated with at least one of the types of accessory tools.

In embodiments, the accessory tool holder may be configured to retain accessory tools with a first type of shank. In such embodiments, a tool holder adaptor may be configured to be retained by the accessory tool holder in a same manner as the accessory tools with the first type of shank, the tool holder adaptor being configured to retain accessory tools with a second type of shank when the tool holder adaptor is retained by the accessory tool holder. The plurality of attachments may comprise a first attachment including a guard/guide portion associated with a first type of accessory tool. The power tool system may include a second attachment having the housing interface and including a guard/guide portion associated with a second type of accessory tool. The first type of accessory tool may comprise a grinding/cutting disc and the first attachment may comprise a guard for the grinding/cutting disc, and the second type of accessory tool may comprise a router bit and the second attachment may comprise a router guide.

According to another embodiment of the present disclosure, a portable power tool includes a housing having a nose portion and a gripping portion. The nose portion defines an opening. A motor is enclosed within the housing, and an output shaft extends through the opening in the nose portion of the housing. An accessory tool holder is secured to an end portion of the output shaft exterior to the nose portion of the housing. The accessory tool holder is configured to retain accessory tools with a first type of shank. A tool holder adaptor is configured to be retained by the accessory tool holder in a same manner as the accessory tools with the first type of shank. The tool holder adaptor being configured to retain accessory tools with a second type of shank when the tool holder adaptor is retained by the accessory tool holder.

Referring now to the drawings, a power tool 10 includes a generally cylindrically shaped housing 14 constructed of a rigid material such as plastic, metal, or composite materials such as a fiber reinforced polymer. The housing 14 includes a nose portion 18 and a main body portion 20. The main body portion 20, also referred to as the gripping portion 20 serves as the handle for the tool 10 and encloses a motor (not shown). In one embodiment, the motor comprises an electric motor configured to receive power from a rechargeable battery 24 connected at the base of the main body portion 20. In alternative embodiments, power may be provided via a power cord (not shown) connected to an AC outlet (not shown). Power to the motor is controlled by a power switch 30 provided on the main body portion 20 of the housing 14 (see FIG. 2).

The motor is coupled to a drive member 32 that extends from the nose portion 18 of the housing. The motor is configured to cause the drive member 32 to rotate. In alternative embodiments, the drive member 32 may be configured to be oscillated by the motor. The drive member 32 includes a tool holder 34 that is configured to releasably retain various accessory tools, such as grinding wheels and cutting discs as discussed below, exterior to the nose portion 18 of the housing 14.

Figure 2:
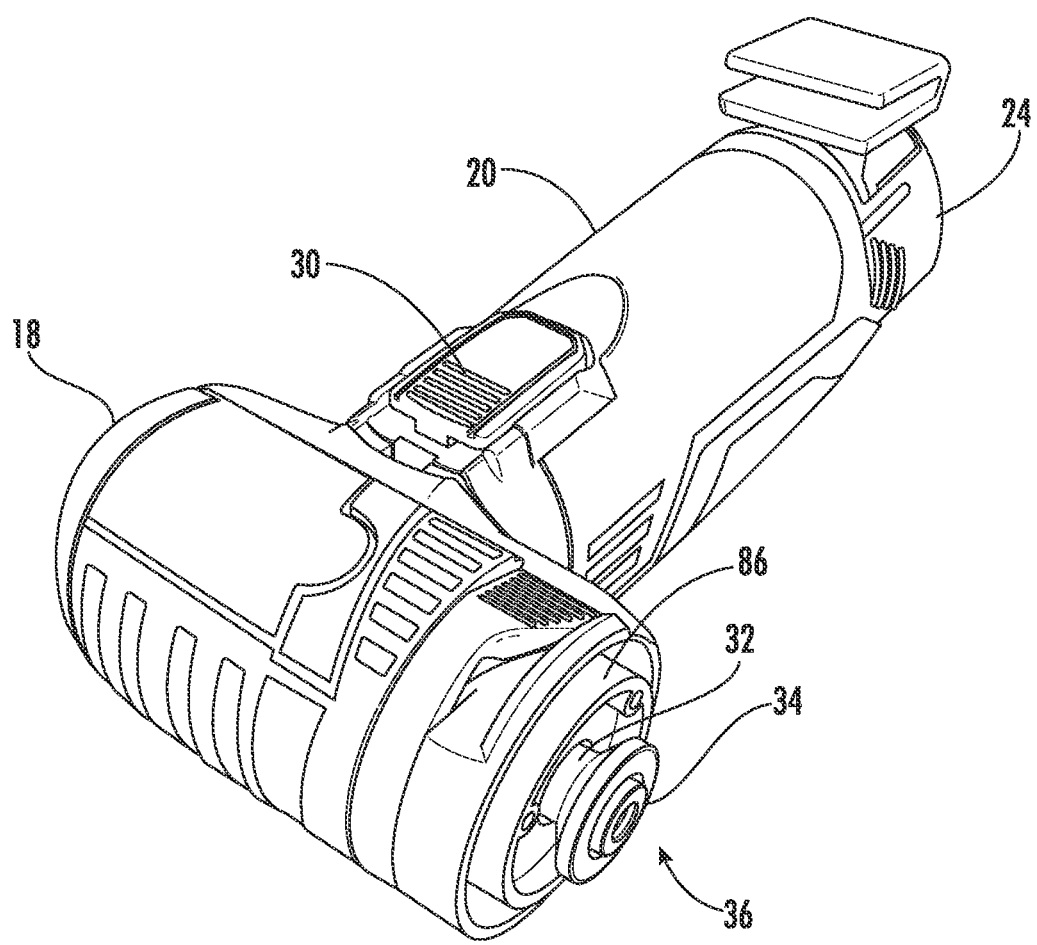
FIG. 2 is a perspective view of the power tool of FIG. 1.
Figure 6:
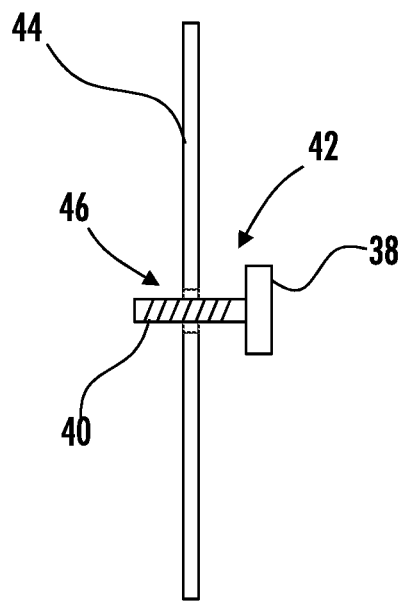
FIG. 6 is a side schematic view of an accessory tool with a first type of shank for use with the tool holder of the power tool of FIG. 1.

The tool holder 34 of the power tool 10 is configured to releasably retain accessory tools with a specific type of shank (e.g., FIG. 6). In the embodiment of FIGS. 1 and 2, the tool holder includes an opening 36 that leads into a threaded bore. The threaded bore is configured to receive the threaded shank 40 (FIG. 6) of a clamping screw 42. Referring to FIG. 6, a disc-shaped accessory tool 44, such as a saw blade, sanding disc, grinding disc, and the like, includes an opening 46 that is aligned with the opening 36 leading to the threaded bore in the tool holder 34. The threaded shank 40 of the clamping screw 42 is inserted through the opening 46 in the disc and threaded into the threaded bore in the tool holder 34 until the head 38 of the clamping screw 42 presses the disc 44 against the tool holder 34.

Figure 3:
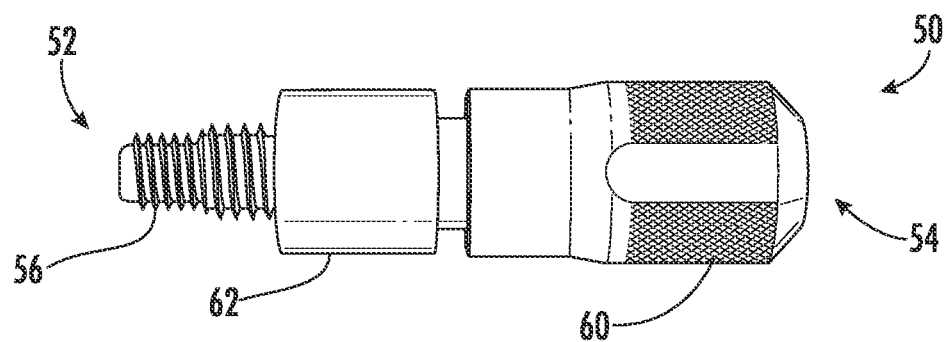
FIG. 3 is a side view of a first embodiment of an accessory adaptor for use with the power tool of FIG. 1.
Figure 4:
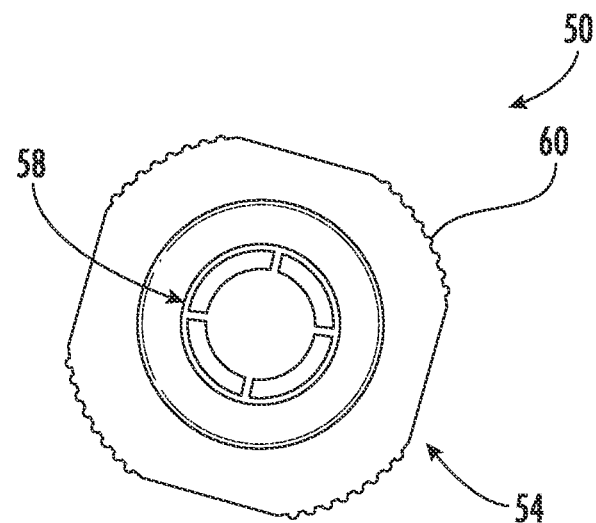
FIG. 4 is a top view of the accessory adaptor of FIG. 3.
Figure 5:
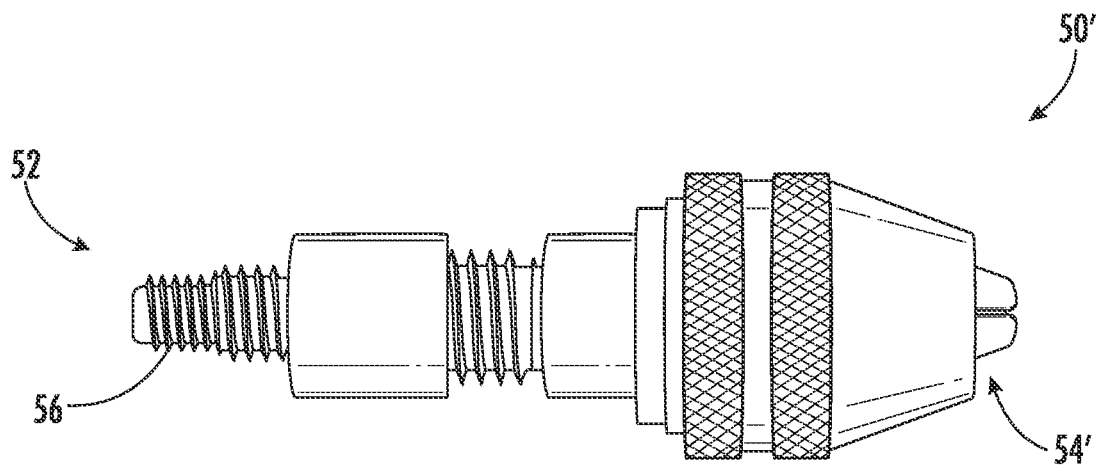
FIG. 5 is a side view of a second embodiment of an accessory adaptor for use with the power tool of FIG. 1.

Referring to FIGS. 3-5, an accessory adaptor 50 is configured to enable accessory tools with other types of shanks to be attached to and driven by the tool holder 34 of the power tool of FIGS. 1 and 2. A first embodiment of an accessory adaptor is depicted in FIGS. 3 and 4. The accessory adaptor 50 includes a tool holder attachment portion 52 at one end and an accessory tool attachment portion 54 at the other end. The tool holder attachment portion 52 is configured to be releasably retained by the tool holder 34 of the power tool. The accessory tool attachment portion 54 is configured to releasably retain accessory tools with different types of shanks (e.g., FIG. 7) so that, when the adaptor 50 is secured to the tool holder 34, the accessory tools with different types of shanks can be driven to perform work on a workpiece.

Figure 8:
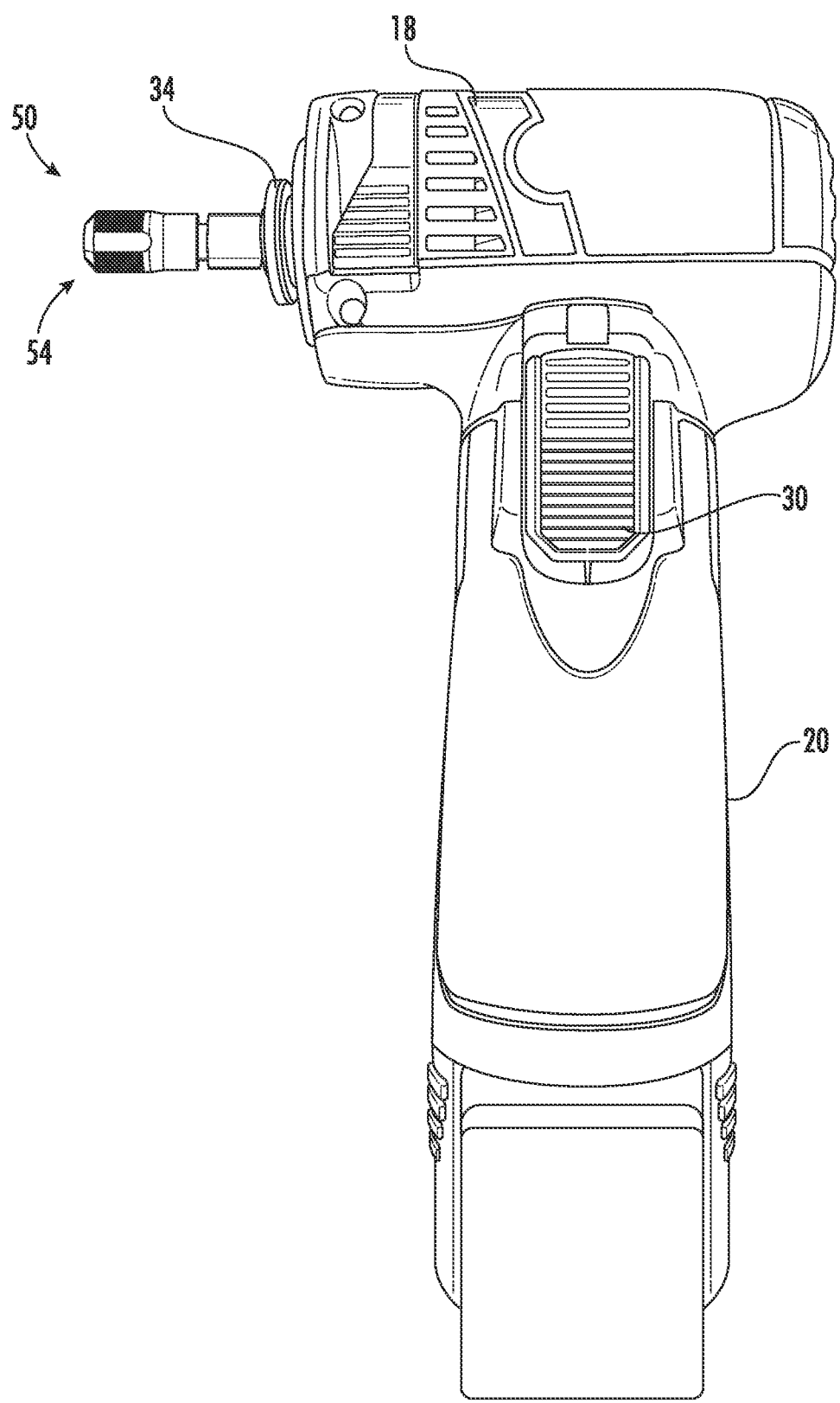
FIG. 8 is a side view of the power tool of FIG. 1 with the accessory adaptor of FIG. 3.

When the tool holder attachment portion 52 is secured onto the tool holder 34 of the power tool as depicted in FIG. 8, the adaptor 50 is driven to rotate along with the tool holder 34. This, in turn, enables any accessory tool retained by the accessory tool attachment portion 54 to be driven to rotate as well. The tool holder attachment portion 52 may be configured to utilize whatever attachment system is implemented on the tool holder 34 of the power tool. For the tool holder 34 of the power tool of FIGS. 1 and 2, the tool holder attachment portion 52 includes a threaded shank 56 which is configured for threaded engagement with the threaded bore of the tool holder 34.

In alternative embodiments, the tool holder 34 of the power tool may use other types of attachment structures in which case the tool holder attachment portion 52 may have the appropriate configuration for interfacing with such structures. For example, the tool holder of the power tool may comprise a threaded stud (not shown) which protrudes from the bottom of the tool holder. In this case, the tool holder attachment system may comprise a threaded bore which is configured to be threaded onto the threaded stud of the tool holder. Any suitable type of attachment system may be implemented on the tool holder attachment portion.

Figure 7:
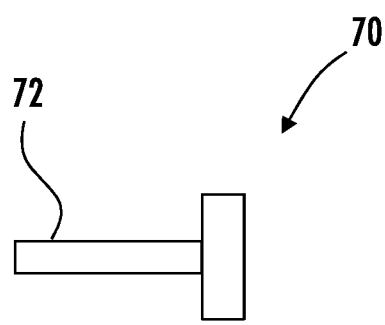
FIG. 7 is a side schematic view of an accessory tool with a second type of shank for use with the accessory adaptors of FIGS. 4-5.

The accessory tool attachment portion 54 is configured to releasably retain at least one other type of accessory tool. In the embodiment of FIGS. 3-5, the accessory tool attachment portion 54 is configured to releasably retain accessory tools 70 having unthreaded cylindrical shanks 72, such as depicted in FIG. 7. To this end, the accessory tool attachment portion 54 of FIGS. 3 and 4 includes a collet 58 and collet nut 60. The collet 58 is inserted into a bore (not shown) in the leading end of the body 62 of the adaptor 50. The collet 58 defines a passage configured to receive the shank 72 of the accessory tool 70 (FIG. 7). The collet nut 60 is installed over the collet 58 and is threaded onto the end of the adaptor body 62. The collet nut 60 has a tapered bore so that as the collet nut 60 is threaded onto the body, the interior surfaces of the collet nut 60 press the collet 58 against the shank of the accessory tool thus securing the collet and accessory tool to the adaptor body.

FIG. 5 depicts a second embodiment of an accessory adaptor 50' for use with the power tool of FIGS. 1 and 2. The accessory adaptor of FIG. 5 includes a tool holder attachment portion 52 which is identical to the tool holder attachment portion of the adaptor of FIG. 3 including the threads 56. The difference between the accessory adaptor 50 of FIG. 3 and the accessory adaptor 50' of FIG. 5 is the configuration of the accessory tool attachment portion 54'. In the embodiment of FIG. 5, the accessory tool attachment portion 54' is configured as a three-jaw chuck.

Figure 9:
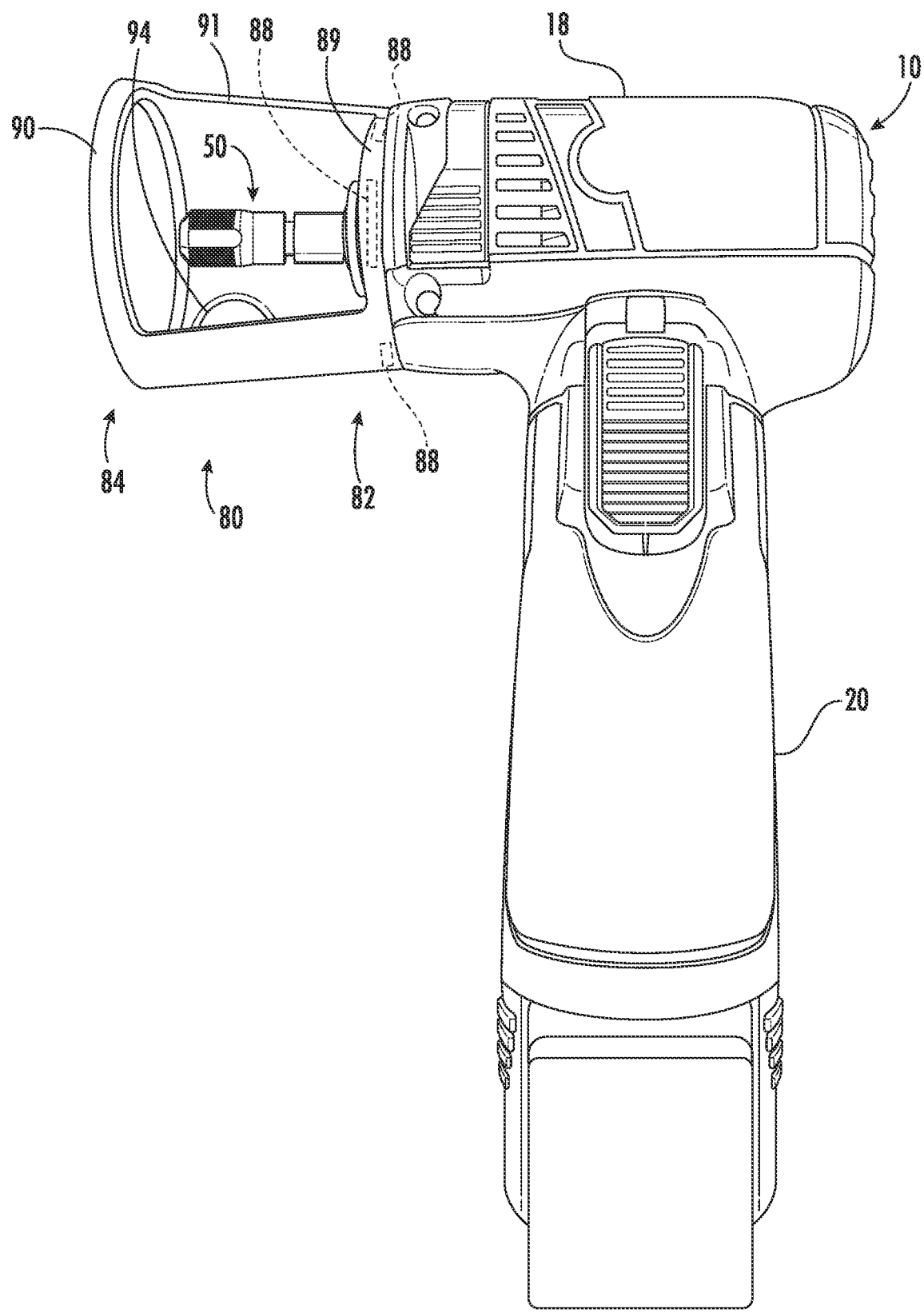
FIG. 9 is a side view of the power tool of FIG. 1 with the accessory adaptor of FIG. 3 and a first embodiment of a guard/guide attachment in the form of a router guide.

Power tools, such as depicted in FIGS. 1 and 2, may be provided with a guard/guide attachment interface that enables different types of guards/guides to be quickly and easily attached to and removed from the power tool to further enhance and broaden the capabilities of the power tool. FIG. 9 depicts an embodiment of a guard/guide attachment 80 on a power tool, such as depicted in FIGS. 1 and 2. The guard/guide attachment includes a housing interface portion 82 and a guard/guide portion 84.

In one embodiment, the housing interface portion 82 of the attachment 80 is configured to use magnetic force to retain the attachment on the nose portion 18 of the housing of the power tool 10. The housing interface portion 82 of the guard/guide attachment is provided with one or more permanent magnets 88 and the nose portion of the housing is provided with or formed of a suitable ferromagnetic material, at least in the attachment interface 86 shown in FIG. 2. In alternative embodiments, the magnets 88 may be provided in the attachment interface 86 of the nose portion 18 of the housing and the ferromagnetic material be provided on the housing interface portion 82 of the guard/guide 80. In either case, the magnet(s) is capable of exerting sufficient magnetic attraction forces to retain the guard/guide 80 in position on the nose portion 18 of the housing under normal operating conditions.

In one embodiment, the tool attachment portion 82 comprises a collar 89 which is configured to be positioned on the nose portion of the housing around the attachment interface 86. The guard/guide portion 84 extends from the housing interface portion and may have different configurations depending on its intended function. FIG. 9 depicts an embodiment of a guard/guide attachment for use with the power tool that is in the form of a router guide. The router guide includes a wall portion 91 that extends from the collar 89 and terminates in a planar guide edge 90. In this embodiment, the adaptor 50 can be used to retain a router bit (see, e.g., FIG. 7).

Figure 10:
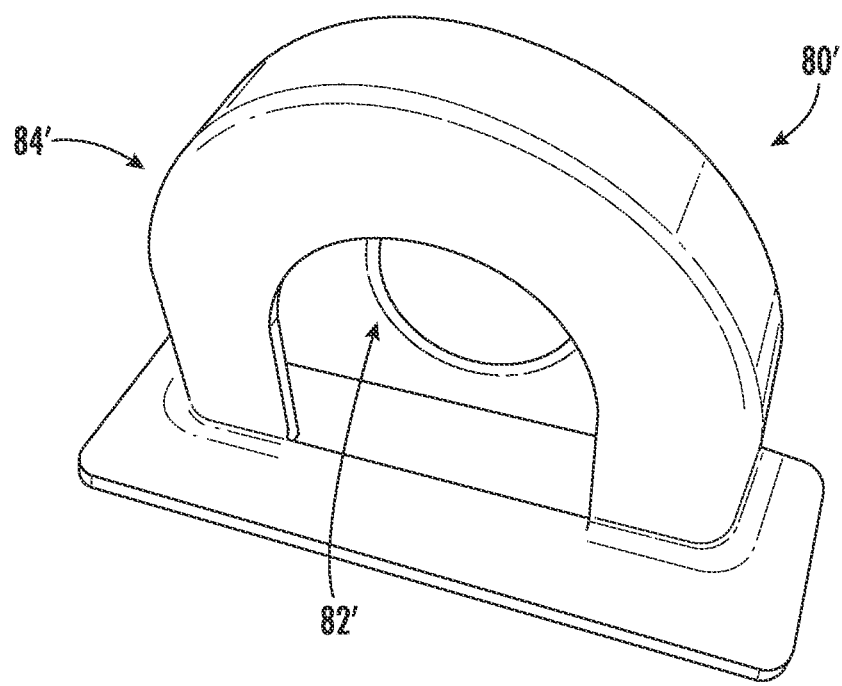

FIG. 10 depicts another embodiment of a guard/guide attachment 80' for use with the power tool of FIGS. 1 and 2 that is in the form of a saw guard. The attachment 80' includes a housing interface portion 82' and a guard/guide portion 84'. The saw guard can be used when the tool holder 34 retains a saw blade (without using the adaptor 50).

Figure 11:
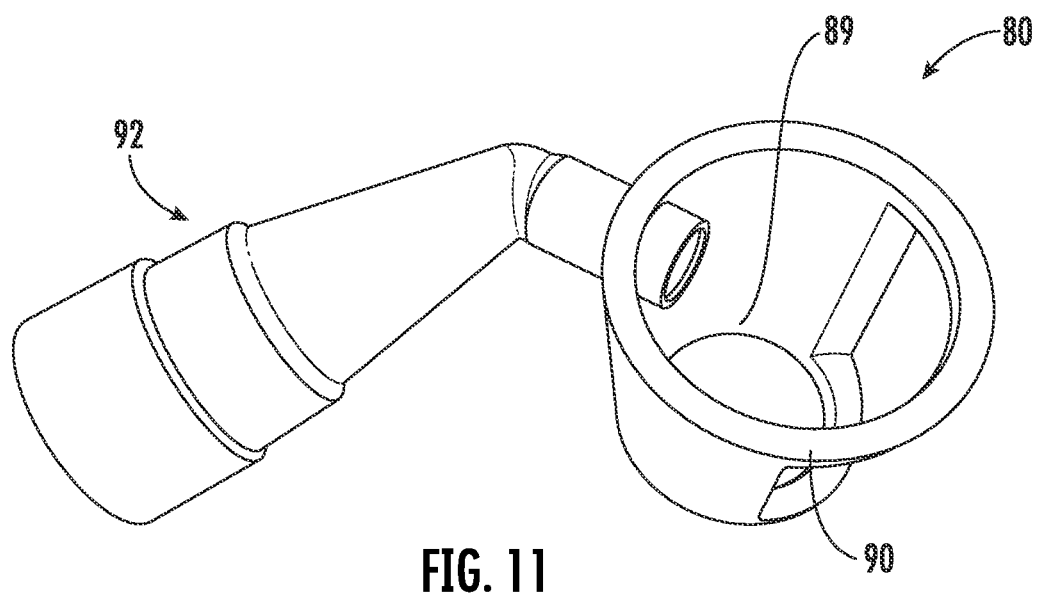
FIG. 11 depicts the router guide of FIG. 9 with a dust extraction tube.
Figure 12:
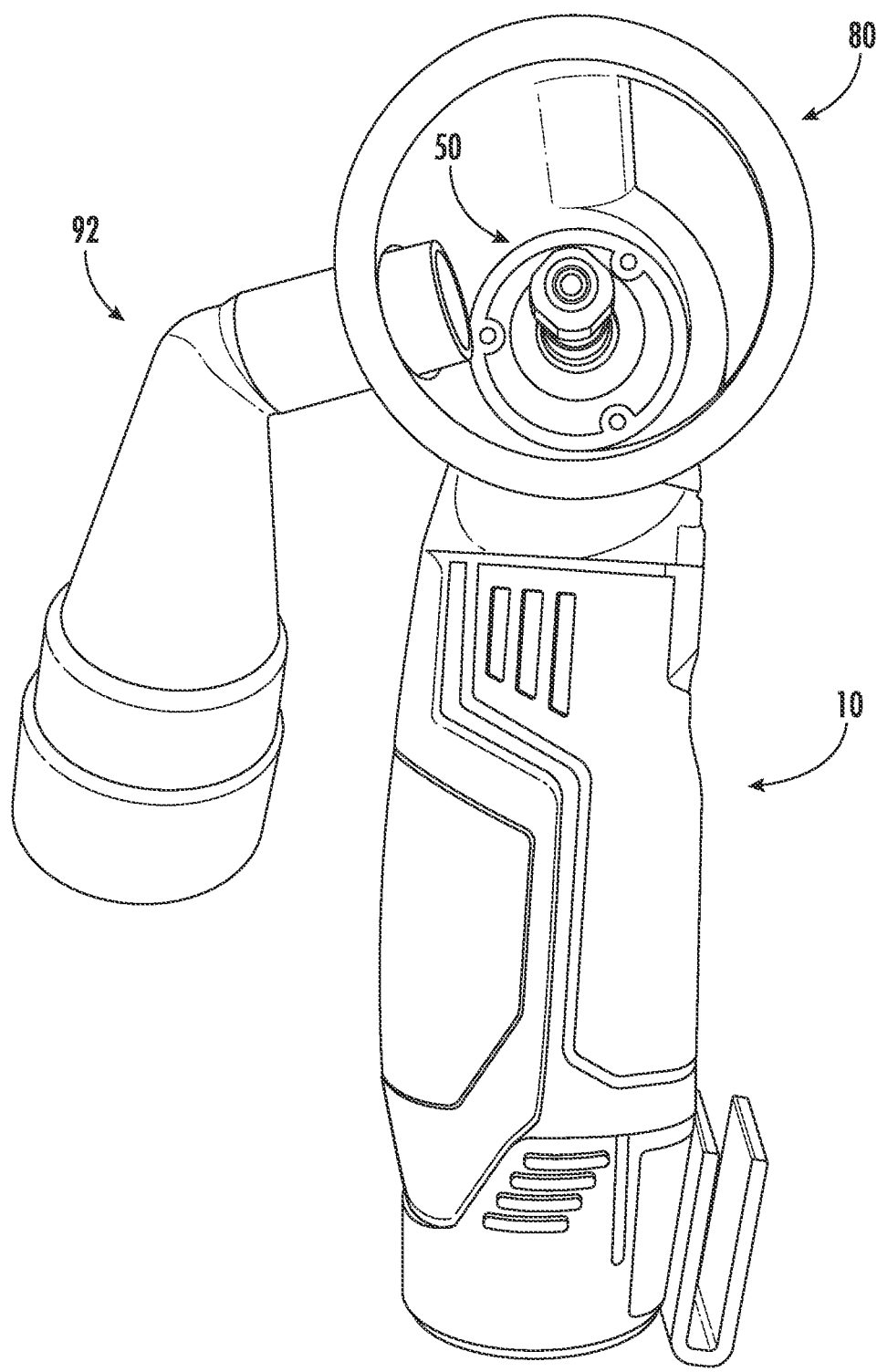
FIG. 12 depicts the router guide and dust extraction tube of FIG. 11 on the power tool of FIG. 1.

FIGS. 11 and 12 depict how the router guide attachment 80 of FIG. 9 can be configured with dust extraction functionality. The router guide attachment 80 includes a port 94 (best seen in FIG. 9) in the side wall that enables a dust extraction tube 92 to be installed on the router guide attachment 80. The dust extraction tube 92 can be connected to a vacuum hose (not shown) to enable dust to be extracted from the work area.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A portable power tool system comprising:
    a portable power tool with a housing including a nose portion and a gripping portion, the nose portion defining an opening;
    a motor enclosed within the housing, the motor including an output shaft, the output shaft extending through the opening defined by the nose portion of the housing;
    an accessory tool holder secured to an end portion of the output shaft located exterior to the nose portion of the housing, the accessory tool holder configured to couple with at least one accessory tool with a first type of shank; and
    an attachment configured to be attached and removed from the nose portion of the housing as desired by an operator of the power tool, the attachment including a first housing interface that is configured to interact with an attachment interface of the nose portion to position the attachment at a first predetermined position on the nose portion of the housing whereat the attachment extends away from the nose portion in a direction along an axis of the output shaft, wherein the attachment interface and the first housing interface are configured to be magnetically attracted to each other with sufficient force to retain the attachment on the nose portion of the housing during normal operating conditions while allowing the attachment to be removed from the nose portion of the housing by hand by the operator.

2. The portable power tool system of claim 1, wherein one of the attachment interface and the first housing interface includes at least one permanent magnet, and wherein the other of the attachment interface and the first housing interface includes at least one ferromagnetic structure configured to be magnetically attracted to the at least one permanent magnet.

3. The portable power tool system of claim 1, wherein the attachment interface includes a cylindrical wall that protrudes along a portion of the output shaft external to, and wherein the first housing interface includes a collar portion that is configured to fit snugly around the cylindrical wall.

4. The portable power tool system of claim 3, wherein the collar portion includes at least one permanent magnet, and wherein the cylindrical wall includes a ferromagnetic material configured to be attracted to the at least one permanent magnet.

5. The portable power tool system of claim 1, wherein:
the attachment includes a first guard/guide portion, the power tool system further comprising:
a further attachment including a second housing interface configured to interact with the attachment interface to position the further attachment at a second predetermined position on the nose portion of the housing, the further attachment including a second guard/guide portion configured differently from the first guard/guide portion.

6. The portable power tool system of claim 1, wherein the accessory tool holder is configured to retain an accessory tool with a first type of shank, the portable power tool system further comprising:
a tool holder adaptor configured to be retained by the accessory tool holder in a same manner as the accessory tool, the tool holder adaptor configured to retain an accessory tool with a second type of shank different from the first type of shank when the tool holder adaptor is retained by the accessory tool holder.

7. The portable power tool system of claim 6, wherein the attachment includes a first guard/guide portion having a first configuration, the power tool system further comprising:
a further attachment including a further housing interface configured to interact with the attachment interface to position the further attachment at a second predetermined position on the nose portion of the housing, the further attachment including a second guard/guide portion configured differently from the first guard/guide portion.

8. The portable power tool system of claim 7, wherein the first configuration is configured to guard/guide a grinding/cutting disc, and
wherein the second configuration is configured to guard/guide a router bit.

9. A portable power tool system comprising:
a portable power tool with a housing including a nose portion and a gripping portion, the nose portion defining an opening;

a motor enclosed within the housing, the motor including an output shaft, the output shaft extending through the opening defined by the nose portion of the housing;

an accessory tool holder secured to an end portion of the output shaft located exterior to the nose portion of the housing, the accessory tool holder configured to retain an accessory tool with a first type of shank; and a tool holder adaptor configured to be retained by the accessory tool holder in a same manner as the accessory tool with the first type of shank, the tool holder adaptor configured to retain an accessory tool with a second type of shank different from the first type of shank when the tool holder adaptor is retained by the accessory tool holder.

10. The portable power tool system of claim 9, further comprising:
an attachment configured to be attached and removed from the nose portion of the housing as desired by an operator of the power tool, the attachment including a first housing interface that is configured to interact with an attachment interface of the nose portion to position the attachment at a predetermined position on the nose portion of the housing, wherein the attachment interface and the first housing interface are configured to be magnetically attracted to each other with sufficient force to retain the attachment on the nose portion of the housing during normal operating conditions while allowing the attachment to be removed from the nose portion of the housing by hand by the operator.

11. The portable power tool system of claim 10, wherein one of the attachment interface and the first housing interface includes at least one permanent magnet, and wherein the other of the attachment interface and the first housing interface includes at least one ferromagnetic structure configured to be magnetically attracted to the at least one permanent magnet.

12. The portable power tool of claim 11, wherein the attachment includes a first guard/guide portion having a first configuration, the power tool system further comprising:
a further attachment including a further housing interface configured to interact with the attachment interface to position the further attachment at a second predetermined position on the nose portion of the housing, the further attachment including a second guard/guide portion configured differently from the first guard/guide portion.

13. The portable power tool of claim 12, wherein the first configuration is configured to guard/guide a grinding/cutting disc, and
wherein the second configuration is configured to guard/guide a router bit.

14. A portable power tool system comprising:
a portable power tool with a housing including a nose portion and a gripping portion, the nose portion defining an opening;

a motor enclosed within the housing, the motor including an output shaft, the output shaft extending through the opening in the nose portion of the housing;

an accessory tool holder secured to an end portion of the output shaft located exterior to the nose portion of the housing, the accessory tool holder configured to couple with at least one accessory tool with a first type of shank;

a tool holder adaptor configured to be retained by the accessory tool holder in a same manner as the at least one accessory tool, the tool holder adaptor configured to retain an accessory tool with a second type of shank different from the first type of shank when the tool holder adaptor is retained by the accessory tool holder; and an attachment configured to be attached and removed from the nose portion of the housing as desired by an operator of the power tool, the attachment including a first housing interface that is configured to interact with an attachment interface of the nose portion to position the attachment at a predetermined position on the nose portion of the housing whereat the attachment extends away from the nose portion in a direction along an axis of the output shaft, wherein the attachment interface and the first housing interface are configured to be magnetically attracted to each other with sufficient force to retain the attachment on the nose portion of the housing during normal operating conditions while allowing the attachment to be removed from the nose portion of the housing by hand by the operator.

15. The portable power tool system of claim 14, wherein one of the attachment interface and the first housing interface includes at least one permanent magnet, and wherein the other of the attachment interface and the first housing interface includes at least one ferromagnetic structure configured to be magnetically attracted to the at least one permanent magnet.

16. The portable power tool system of claim 14, wherein the attachment includes a guard/guide portion having a first configuration, the portable power tool system further comprising:

a further attachment including a further housing interface configured to interact with the attachment interface to position the further attachment at a second predetermined position on the nose portion of the housing, the further attachment including a second guard/guide portion configured differently from the first guard/guide portion.

17. The portable power tool system of claim 16, wherein the first configuration is configured to guard/guide a grinding/cutting disc, and wherein the second configuration is configured to guard/guide a router bit.

* * * * *

UNITED STATES PATENT AND TRADEMARK OFFICE
CERTIFICATE OF CORRECTION

| | | |
|---|---|---|
| PATENT NO. | : 11,850,719 B2 | Page 1 of 1 |
| APPLICATION NO. | : 16/447202 | |
| DATED | : December 26, 2023 | |
| INVENTOR(S) | : Crowell et al. | |

It is certified that error appears in the above-identified patent and that said Letters Patent is hereby corrected as shown below:

In the Claims

In Claim 3, at Column 7, Line 20: "a portion of the output shaft external to," should read --a portion of the output shaft external to the housing,--.

Signed and Sealed this
Twenty-third Day of July, 2024

Katherine Kelly Vidal
*Director of the United States Patent and Trademark Office*